UNITED STATES PATENT OFFICE.

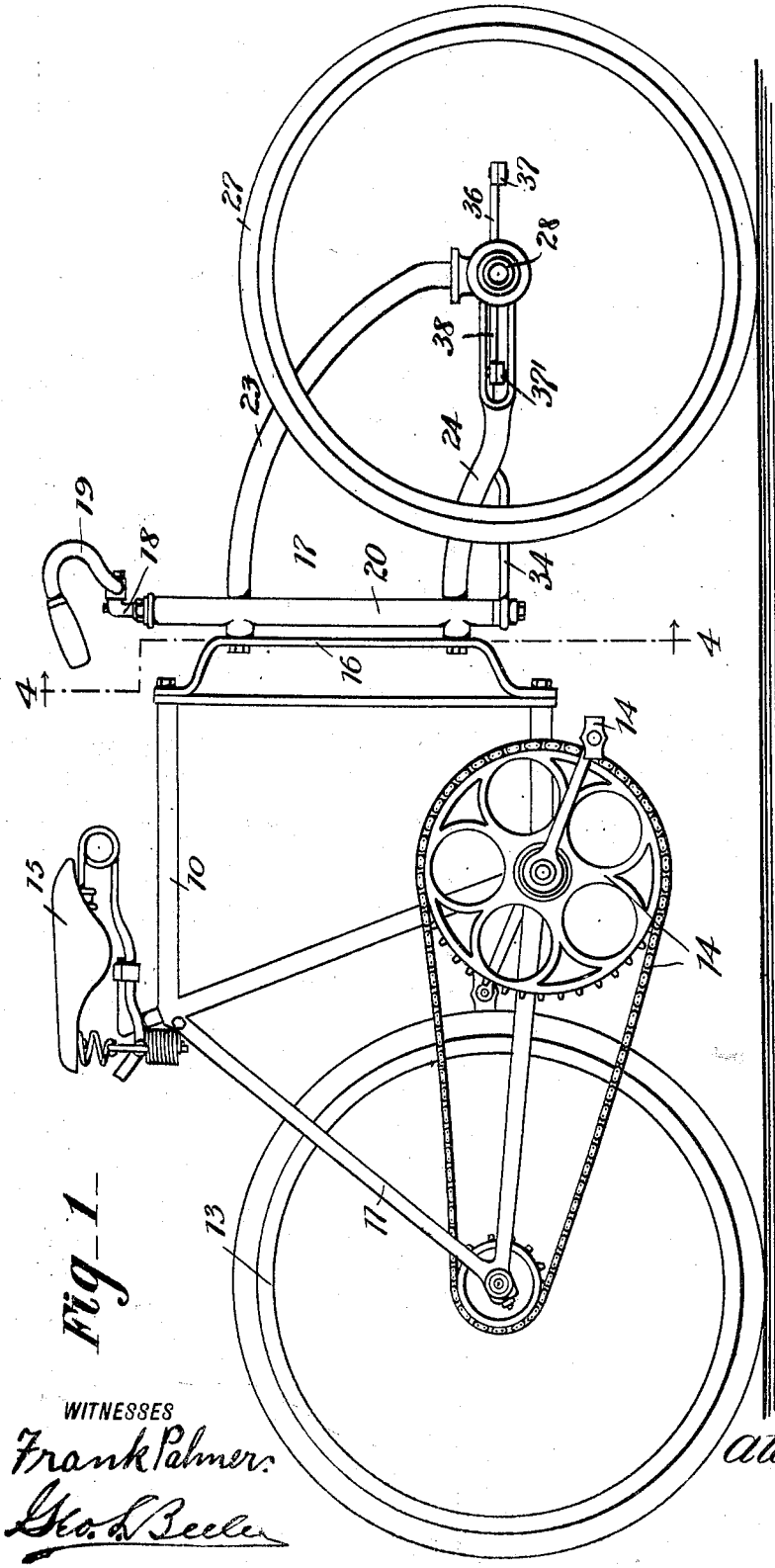

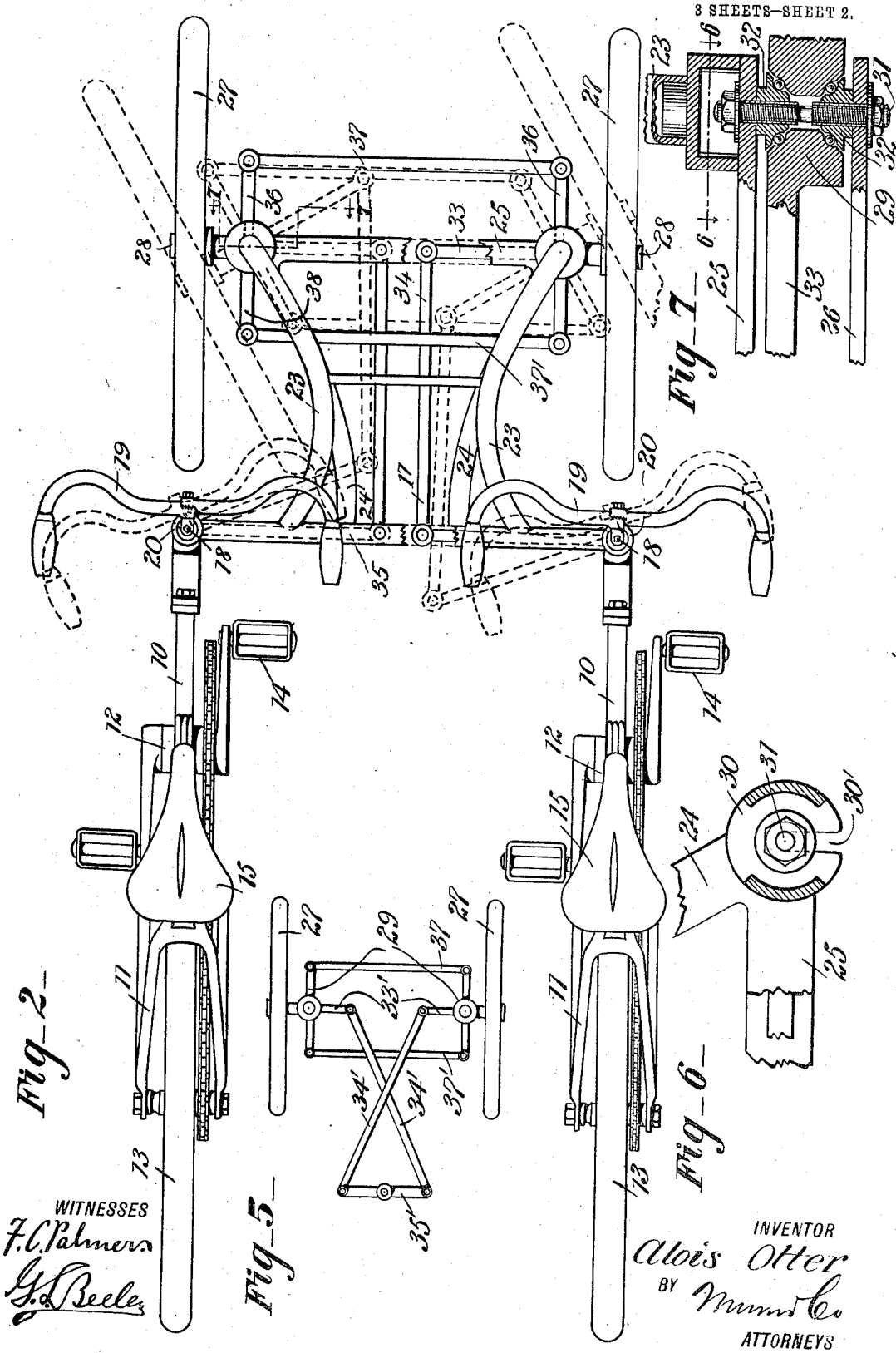

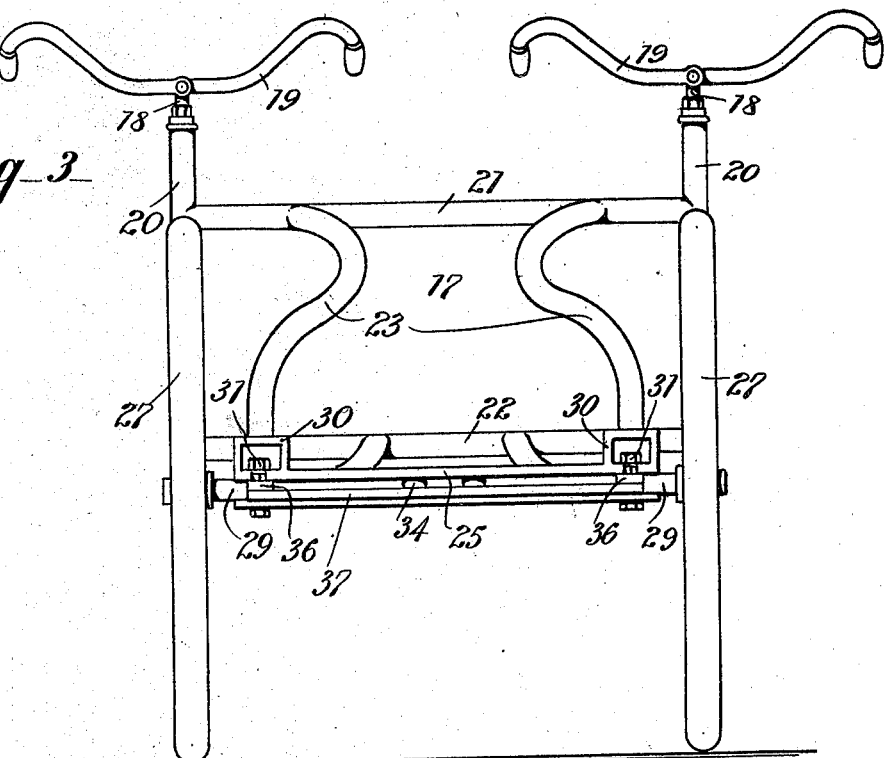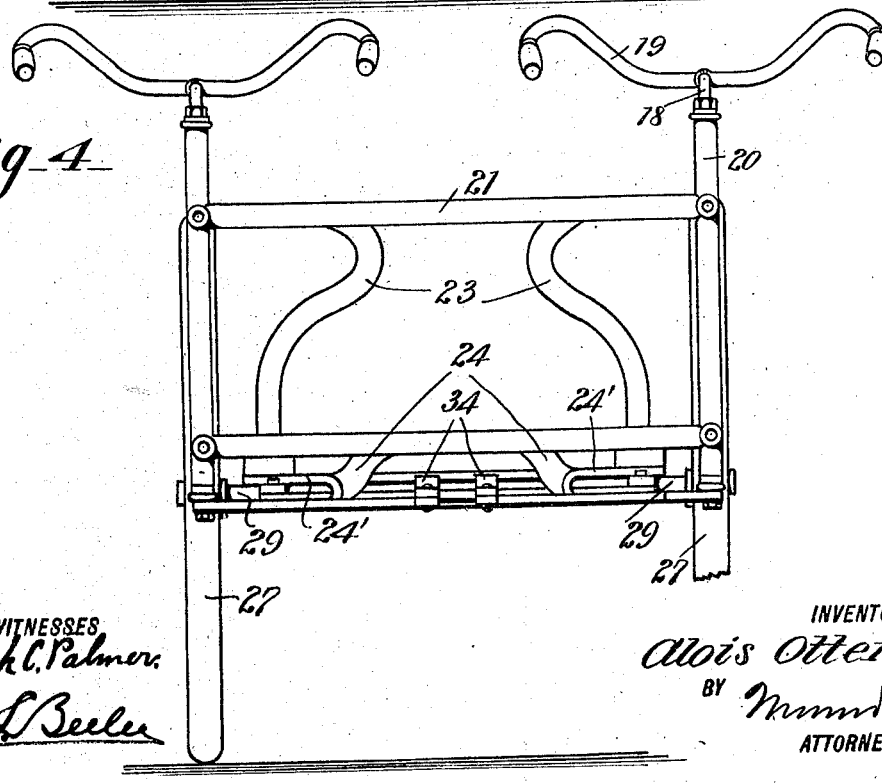

ALOIS OTTER, OF NEW YORK, N. Y.

STEERING-GEAR FOR VEHICLES.

1,093,466. Specification of Letters Patent. Patented Apr. 14, 1914.

Application filed September 11, 1913. Serial No. 789,317.

*To all whom it may concern:*

Be it known that I, ALOIS OTTER, a citizen of the United States, and a resident of the city of New York, Ridgewood, borough of Queens, in the county of Queens and State of New York, have invented a new and Improved Steering-Gear for Vehicles, of which the following is a full, clear, and exact description.

This invention relates to steering gears for vehicles, and has particular reference to means of this character for use in connection with compound cycles or devices which are propelled by the riders or by motive power.

More particularly stated the invention contemplates the employment of two bicycle constructions made or connected in parallel and with a single steering mechanism for the combined vehicle.

Another object of the invention is to increase the stability and reliability of a vehicle of this character with respect to the steering mechanism.

A still further object of the invention is to improve the means for connecting the main part of the frame with the steering head or fork so that the rear wheels may have a certain amount of independent movement when, for instance, the vehicle is passing over rough or uneven ground.

The foregoing and other objects of the invention will hereinafter be more fully described and claimed and illustrated in the drawings forming a part of this specification in which like characters of reference indicate corresponding parts in all the views, and in which—

Figure 1 is a side elevation of a preferred embodiment of this invention; Fig. 2 is a plan view of the same; Fig. 3 is a front elevation; Fig. 4 is a rear elevation of the front part of the machine, as viewed from the line 4—4 of Fig. 1; Fig. 5 is a diagram indicating a steering device adapted to be operated from a single cross bar or steering wheel; Fig. 6 is a horizontal detail on the line 6—6 of Fig. 7; and Fig. 7 is a detail in vertical section on the line 7—7 of Fig. 2.

The several parts of the device may be made of any suitable materials, and from what has been stated above it will be understood that the general form or adaptation of the device may be varied to a considerable extent as, for instance, in the application thereof to automobiles or the like, without departing from the spirit of the invention hereinafter more fully set forth and specifically claimed.

In the preferred form of the invention, shown in Figs. 1 and 2, I provide a pair of frames 10 of any suitable nature, but preferably of the well known diamond type of bicycles, each frame having a rear fork 11, a crank hanger 12, a wheel 13 and propelling mechanism of well known construction indicated as a whole at 14. These frames 10 and wheels 13 are adapted to support individual riders upon seats 15, and except as noted below, there is no direct connection between them. The front end of each frame 10 is secured by means of a spring bar 16 to a steering head or frame 17. Said frame 17 includes a steering post 18 having connected thereto a handle bar 19 at each side thereof. A head 20 for each post 18 is rigidly connected by cross bars 21 and 22 to the other head 20. Furthermore, a series of bars 23 and 24 are provided, leading toward a pair of transverse parallel bars 25 and 26. The front ends of the bars 24 are provided with forks 24' for supporting the front wheels and steering mechanism therefor. I provide preferably two front supporting wheels 27, each of these wheels being journaled upon a short shaft 28 extending outwardly from a steering knuckle 29. The front or lower ends of the bars 23 are connected to the steering knuckle through slotted plates 30, the slot 30' of each of said plates receiving the pivot bolt 31 of the knuckle 29. The thimble or plate 30 constitutes a rigid permanent connection for the adjacent ends of the bars 23, 24 and 25. Said pivot bolt 31 is provided with a pair of cones 32 having ball bearing connection with the knuckle 29 as shown in Fig. 7. The inner end 33 of each steering knuckle is connected by means of a link 34 to a crank 35 leading inwardly from the lower end of the steering post 18, as shown especially in Fig. 2, wherein is shown the machine in normal position in full lines and in dotted lines is indicated the position in which the movable parts are placed during the steering operation. The steering knuckles are provided with forwardly extending arms 36 connected by a distance bar 37 and likewise a pair of arms 38 extending rearwardly are connected by another bar 37'. The arms 36 and 38 and the distance bars 37 and 37' constitute a parallelogram serving to maintain the front wheels always parallel, and hence make the entire construction unusually stable and reliable. The turning of either handle bar in either direction will cause the wheels to be steered in a corresponding direction and hence the movement of the other handle bar in the same direction through the connections just referred to. In the event that either of the distance bars 37 or 37' should become broken or detached, the other of said bars may be relied upon to serve its proper function.

The diagram in Fig. 5 shows a structure in which the wheels 27 are provided with steering knuckles 29 as in the other case, but the arms 33' extending inwardly toward each other are connected by means of a pair of links 34' to a single steering mechanism shown at 35'. The links 34' are crossed so as to produce an effect substantially similar to the effect of the two cranks 35 extending toward each other from the individual steering posts 18 in the other form of the invention. The same distance bars 37 and 37' are preferably used in this form of the invention also.

Having thus described my invention, I claim as new and desire to secure by Letters Patent:—

1. In a device of the character set forth, the combination of a rigid front frame, a pair of wheels supporting said frame, steering means for said wheels serving to maintain them in positive parallelism, a pair of independent rear frames connected at their front ends to said front frame, a spring plate serving to make the connection between each of said rear frames and the front frame, and rear supporting wheels journaled in said rear frames.

2. In a device of the character set forth, the combination of a front frame having a pair of substantially vertical steering heads and a series of bars extending forwardly therefrom, a pair of wheels supporting said frame, steering mechanism between said wheels and said steering heads, a pair of spaced independent rear frames each having a supporting wheel and propelling mechanism, and a vertically arranged flat spring plate securing the front end of each of said rear frames to the corresponding steering head aforesaid, whereby the rear frames may partake of independent movements in parallel vertical planes.

3. In a device of the character set forth, the combination of a rigid front steering frame comprising vertical steering heads 20, transverse bars 21 and 22 connecting the same, forwardly extending braces 23 and 24, transverse front bars 25 and 26, a pair of steering knuckles journaled on vertical axes to said braces, said knuckles having forwardly and rearwardly extending arms, distance bars connecting the respective arms of both knuckles and constituting therewith a parallelogram, a pair of rearwardly extending links connected to said knuckles, and steering mechanism journaled in said steering heads serving to control the operation of said links and knuckles, substantially as set forth.

In testimony whereof I have signed my name to this specification in the presence of two subscribing witnesses.

ALOIS OTTER.

Witnesses:
 Geo. L. Beeler,
 Geo. H. Emslie.

---

Copies of this patent may be obtained for five cents each, by addressing the "Commissioner of Patents, Washington, D. C."